US005323732A

United States Patent [19]

Consolo

[11] Patent Number: 5,323,732

[45] Date of Patent: Jun. 28, 1994

[54] WATCH POINTERS WITH MEANS FOR SETTING THEREIN VARIABLE-SIZE DIAMONDS OR OTHER STONES

[76] Inventor: Giovanni B. Consolo, Localita Vico, 87056 Santo Stefano Di Rigliano (Cosenza), Italy

[21] Appl. No.: 57,262

[22] Filed: May 4, 1993

[30] Foreign Application Priority Data

May 14, 1992 [IT] Italy ............................ MI92U-00478

[51] Int. Cl.[5] ........................ G01D 13/22; G04B 19/04

[52] U.S. Cl. .................................... 116/328; 116/332; 368/238

[58] Field of Search ............... 116/327, 328, 329, 330, 116/331, 332, 333; 368/228, 238, 285; 63/2, 21, 26, 27, 28; 29/10; D10/122, 127; D11/40, 43, 47, 86, 89, 91

[56] References Cited

U.S. PATENT DOCUMENTS 2,536,206 1/1951 Newhouse .............................. 63/26

FOREIGN PATENT DOCUMENTS 2339858 2/1974 Fed. Rep. of Germany ...... 368/285
0095892 3/1992 Japan .................................. 368/285
0001823 1/1890 Switzerland ........................ 368/238

*Primary Examiner*—William A. Cuchlinski, Jr.
*Assistant Examiner*—Willie Morris Worth
*Attorney, Agent, or Firm*—Bucknam and Archer

[57] ABSTRACT

The present invention relates to watch pointers in which it is possible to set variable-size diamonds or other stones, the pointers including at least a recess in which it is possible to engage one or more stones, and also including fixing elements for fixing the set stones.

4 Claims, 2 Drawing Sheets

WATCH POINTERS WITH MEANS FOR SETTING THEREIN VARIABLE-SIZE DIAMONDS OR OTHER STONES

BACKGROUND OF THE INVENTION

The present invention relates to a improved pointers for watches, in which it is possible to set small diamonds or other types of stones either of precious or not precious nature.

In the watch field there are already known several watches made of precious materials and with very sophisticated patterns.

The watch pointers, however, are generally made of a metal material and, frequently, they are coated by paints which, on the other hand, do not allow to easily see the pointers.

SUMMARY OF THE INVENTION

The object of the present invention is to overcome the above mentioned drawback, by providing improved pointers for watches in which it is possible to set small diamonds, or other stones, of varying size, so as to allow the pointers to be easily seen thereby facilitating the detection of the hour indicated by the watch.

Within the scope of the above mentioned object, a main object of the present invention is to provide such a watch pointer construction on which the stones can be easily and safely applied, and which pointer can be applied to any desired type of watch.

According to one aspect of the present invention, the above mentioned aim and object, as well as yet other objects, which will become more apparent hereinafter, are achieved by an improved pointer for watches, particularly designed for setting therein small diamonds or other stones, of variable size, characterized in that said pointer comprises a recess in which one or more stones can be engaged, fixing means being moreover provided for safely fixing said stones in said recess.

BRIEF DESCRIPTION OF THE DRAWINGS

Further characteristics and advantages of the improved pointer for watches according to the present invention will become more apparent hereinafter from the following detailed disclosure of preferred, though not exclusive, embodiments thereof which is illustrated in the figures of the accompanying drawings, where.

DESCRIPTION OF THE PREFERRED EMBODIMENTS

With reference to the number references of the figures of the accompanying drawings, the watch pointer according to the present invention, specifically designed for setting therein small diamonds or other stones, includes a flat strip-like pointer body having two rectilinear longitudinal opposite edges and a pointed outer tip, which pointer body, according to the invention, is provided with at least a stone housing seat or recess and preferably a plurality of aligned stone holding recesses, means being provided for anchoring in said recesses the stones to be set.

Figure 1:
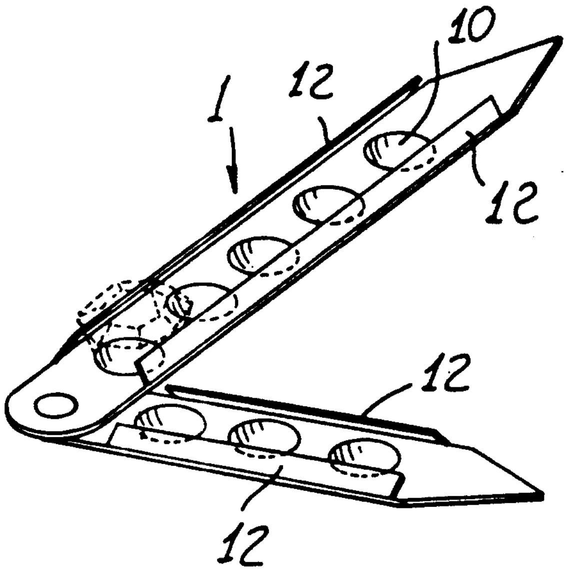
FIG. 1 illustrates pair of metal pointers including seats for engaging therein single stones of round cross-section, with a single clamp element for locking the stones.
Figure 2:
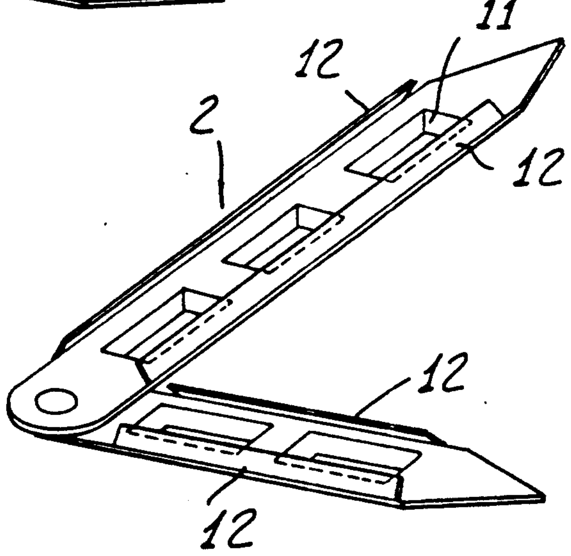
FIG. 2 illustrates a pair of metal pointers including recesses for individual stones, of rectangular cross-section, and with a single clamp element for locking the stones.
Figure 3:
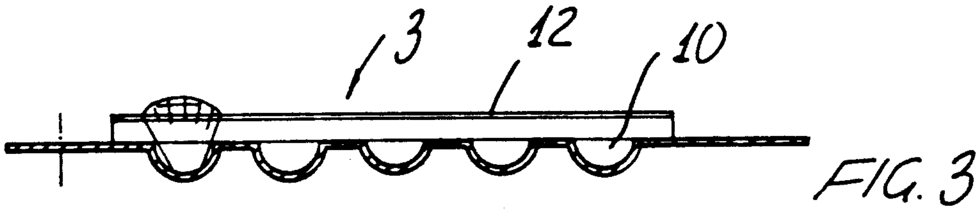
FIG. 3 is a cross-sectional view illustrating a metal pointer provided with several seats for housing therein stones of the closed bottom type, having a round cross-section, with a single clamp element for locking the stones.
Figure 4:
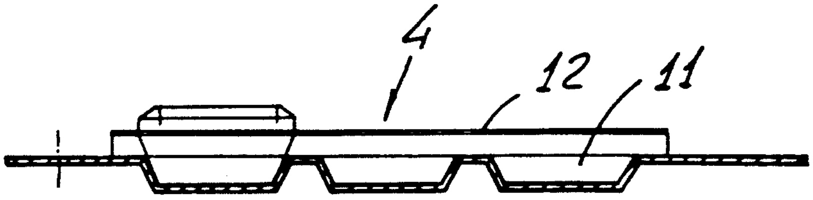
FIG. 4 is a further cross-sectional view illustrating a metal pointer, including several seats for housing therein corresponding stones, of rectangular cross-section closed type, and with a single clamp element for locking the stones.
Figure 5:
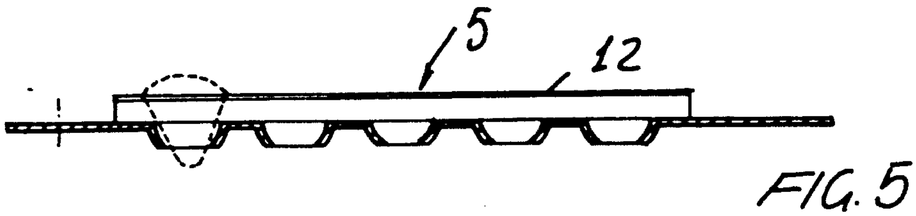
FIG. 5 is a further cross-sectional view illustrating a metal pointer including several seats for housing therein corresponding stones, of a round-cross section open type, and with a single clamp element for locking the stones.
Figure 6:
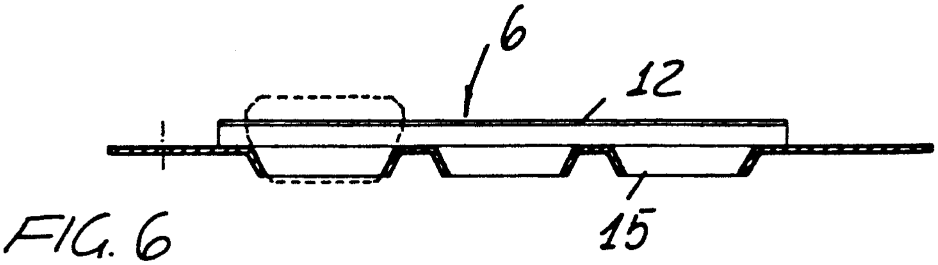
FIG. 6 is a further cross-sectional view illustrating a metal pointer, provided with several seats for housing therein corresponding stones, of a rectangular cross-section open type, with a single clamp element for locking the stones.
Figure 7:
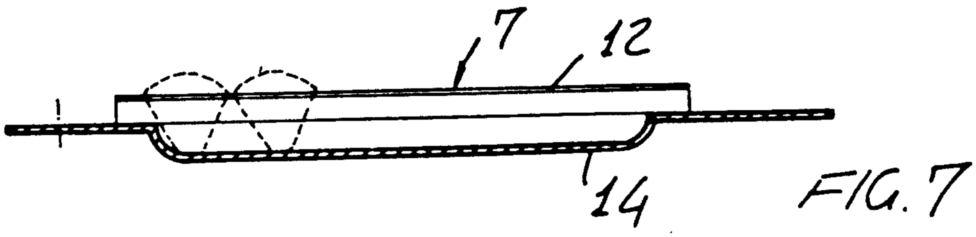
FIG. 7 is a further cross-sectional view illustrating a metal pointer provided with a single recess for receiving therein several stones, of a closed type, with a single clamp element for locking the stones.
Figure 8:
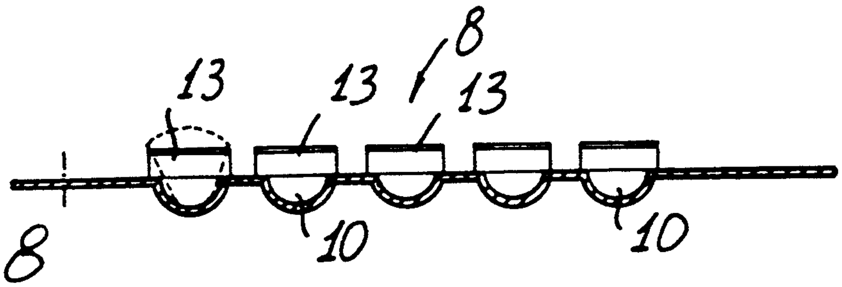
FIG. 8 is a further cross-sectional view illustrating a metal pointer adapted to house several stones, of closed type, with a round-cross section, and having a clamp element for locking each stone.
Figure 9:
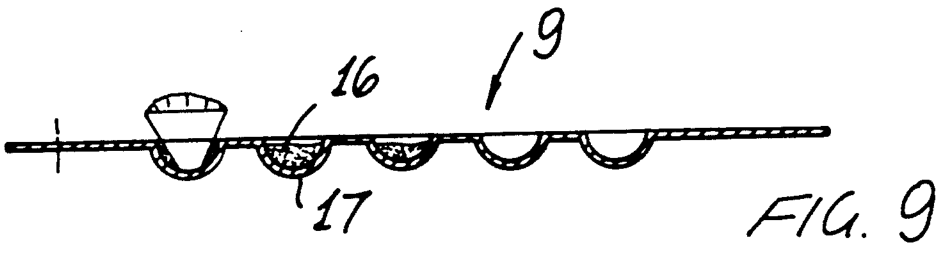
FIG. 9 is a further cross-sectional view illustrating a metal pointer designed for supporting or housing several stones, of a round crosssection closed type, and on which the stones are glued.

With reference to FIGS. 1 to 9, each stone housing seat comprises a recess, having a substantially half-spherical shape 10, for housing the rear or bottom portion of or respective stone, or of tapering rectangular cross section 11, if the stone has a rectangular cross section cut.

In this connection it should be apparent that the recess can have any desired suitable shape and it can have either a closed or "perforated" bottom.

Laterally of the recess there are provided, on the two opposite longitudinal edges of the pointer, two anchoring strip clamp means, either individual 13 for a single stone (in which case the stone clamp means 13 will have a length substantially corresponding to the stone diameter or length), or multiple 12 for several stones arranged with an aligned relationship.

In the case of "multiple" clamp means 12 provided for simultaneously clamping a plurality of aligned stones housed in a corresponding plurality of recesses, each clamp means will comprise a thin strip element having a length adapted to simultaneously firmly hold said plurality of stones, and the two stone clamping strips, extending along the two opposite longitudinal edges of the pointer, will also provide a pointer stiffening function, which is very important since usually these pointers are made of a very thin sheet metal material.

The stones can be held, instead of using clamp elements, also by using a suitable glue 16 specifically designed for firmly anchoring the stones to the bottom of the recess 17.

As stated, the recess can be either of a closed type 14, or of an open type 15, that is the bottom of the recess can be either closed or perforated.

In the latter case, then, if the stone is a clear one, it will be possible to see the colour of the watch dial.

From the above disclosure it should be apparent that the invention achieves the intended aim and objects.

In fact, the watch pointer according to the present invention allows an user to easily see the hour, owing to the good gloss of the stones with respect to the watch deal.

This effect is further improved by suitably selecting the col ours of the stones, which must provide a suitable contrast with respect to the colour of the deal.

The invention as disclosed is susceptible to several variations and modifications all of which will come within the scope of the invention.

Moreover, all of the details can be replaced by other technically equivalent elements.

In practicing the invention, the used materials, provided that they are compatible to the intended use, as well the contingent size and shapes, can be any according to requirements.

I claim:

1. A watch pointer, specifically designed for setting therein small diamonds or other stones, said pointer having a pointer flat body defining two longitudinal opposite rectilinear pointer edges and a pointed pointer tip, said pointer comprising a plurality of stone holding aligned recesses for housing therein a respective stone, said recesses being substantially aligned parallel to said two longitudinal edges of said pointer, fixing means being moreover provided for firmly fixing each said stone in each said recess, wherein said fixing means comprise two stone clamping strip elements associated with said pointer body at said two longitudinal opposite edges thereof.

2. A pointer according to claim 1, wherein said two stone clamping strip elements are adapted to clamp individually each said stone, said strip elements having a length substantially corresponding to the stone length.

3. A pointer according to claim 1, wherein said two stone clamping strip elements are adapted to simultaneously clamp said plurality of aligned stones while stiffening said pointer body.

4. A pointer according to claim 1, wherein each said recess has a closed bottom.

* * * * *